(12) United States Patent
Zou

(10) Patent No.: US 10,773,622 B2
(45) Date of Patent: Sep. 15, 2020

(54) ALL-TERRAIN VEHICLE AND ITS SEAT INSTALLATION STRUCTURE

(71) Applicant: Zhejiang CFMOTO Power Co., Ltd., Hangzhou, Zhejiang (CN)

(72) Inventor: Pengfei Zou, Hangzhou (CN)

(73) Assignee: Zhejiang CFMOTO Power Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/109,569

(22) Filed: Aug. 22, 2018

(65) Prior Publication Data
US 2019/0061580 A1  Feb. 28, 2019

(30) Foreign Application Priority Data

Aug. 25, 2017  (CN) .......................... 2017 1 0742826

(51) Int. Cl.
*B60N 2/68* (2006.01)
*B60N 2/72* (2006.01)
(Continued)

(52) U.S. Cl.
CPC ......... *B60N 2/682* (2013.01); *B60N 2/01583* (2013.01); *B60N 2/38* (2013.01);
(Continued)

(58) Field of Classification Search
CPC ...... B60N 2/015; B60N 2/01508; B60N 2/38; B60N 2/503; B60N 2/682;
(Continued)

(56) References Cited

U.S. PATENT DOCUMENTS

| | | | | |
|---|---|---|---|---|
| 4,648,655 A | * | 3/1987 | Moorhouse | B60N 2/38 248/222.41 |
| 5,320,408 A | * | 6/1994 | Wansley | A47C 7/425 297/230.14 |

(Continued)

FOREIGN PATENT DOCUMENTS

| | | | | |
|---|---|---|---|---|
| JP | 2003038294 A | * | 2/2003 | ......... B60N 2/01508 |
| WO | WO-2008071179 A2 | * | 6/2008 | ............. B60N 2/015 |

*Primary Examiner* — Ryan D Kwiecinski
(74) *Attorney, Agent, or Firm* — Jeffrey D. Shewchuk; Shewchuk IP Services, LLC

(57) ABSTRACT

The invention provides a type of all-terrain vehicle seat installation structure; it includes the cab frame and the seat backrest arranged on the frame; the back mounting side of the seat backrest includes the first mounting part and the second mounting part arranged up and down respectively. The first mounting part includes the upper support frame located at the upper end of the frame; the installation hole is arranged on the upper support frame; the installation pin inserted into the installation hole is extended out of the seat backrest. The second mounting part includes the lower support frame located at the lower end of the frame; the lower end of the seat backrest is provided with the installation buckle mounted on the lower support frame. The top of the seat backrest is limited by the installation pin being inserted into the installation hole; the seat backrest is supported by the bottom installation buckle; the top of the seat backrest is limited by the inserting installation structure of the installation pin and the installation hole to avoid the seat backrest moving up and down on the frame, so the stability of the seat installation structure of the all-terrain vehicle is improved. The invention also provides a type of all-terrain vehicle provided with the seat installation structure of the all-terrain vehicle as described above.

10 Claims, 4 Drawing Sheets

(51) Int. Cl.
  *B60N 2/01* (2006.01)
  *B60N 2/50* (2006.01)
  *B62D 21/18* (2006.01)
  *B60N 2/38* (2006.01)
  *B60N 2/015* (2006.01)

(52) U.S. Cl.
  CPC ............... *B60N 2/503* (2013.01); *B60N 2/72* (2013.01); *B62D 21/186* (2013.01); *B60N 2002/684* (2013.01)

(58) Field of Classification Search
  CPC .............................................. B60N 2002/684; B60N 2/01583; B60N 2/72; B62D 23/005; B62D 21/186
  See application file for complete search history.

(56) References Cited

U.S. PATENT DOCUMENTS

| | | | |
|---|---|---|---|
| 8,313,136 B2* | 11/2012 | Arnold | B60P 3/423 |
| | | | 296/183.2 |
| 2009/0058146 A1* | 3/2009 | Kobayashi | B60N 3/06 |
| | | | 296/204 |
| 2009/0072603 A1* | 3/2009 | Kobayashi | B60N 2/22 |
| | | | 297/354.1 |
| 2017/0015216 A1* | 1/2017 | Hayashi | B60N 2/38 |
| 2018/0022295 A1* | 1/2018 | Boyce | B60R 13/0206 |
| | | | 248/205.1 |
| 2019/0021506 A1* | 1/2019 | Friede | A47C 4/02 |
| 2019/0061580 A1* | 2/2019 | Zou | B60N 2/72 |
| 2019/0111816 A1* | 4/2019 | Katoh | B60N 2/682 |
| 2019/0210484 A1* | 7/2019 | Deckard | B60N 2/065 |
| 2019/0210668 A1* | 7/2019 | Endrizzi | B60K 11/00 |
| 2019/0275913 A1* | 9/2019 | O'Connor | B60N 2/012 |

* cited by examiner

ALL-TERRAIN VEHICLE AND ITS SEAT INSTALLATION STRUCTURE

CROSS-REFERENCE TO RELATED U.S. APPLICATION(S)

None.

FIELD OF THE INVENTION

The invention relates to the technical field of the all-terrain vehicle, particularly to a type of all-terrain vehicle and its seat installation structure.

BACKGROUND OF THE INVENTION

All-terrain vehicles are commonly known as "beach vehicles", or "all-terrain four-wheel off-road motor vehicles". Such vehicles are simple and practical, can provide good off-road performance, and are generally not equipped with a canopy. As used herein, the term "all-terrain vehicle" means a vehicle that can travel on rugged terrain and can move freely on terrain over which ordinary vehicles find difficult to travel. Some people also call such a vehicle a "four-wheel motorcycle" because its structure is very similar to motorcycle and many parts are common to motorcycles. Such vehicles are used widely and are is not limited by road conditions.

For one type of all-terrain vehicle with a cab, the seats are arranged inside the cab with three seats arranged in a row of seats. The seats of the all-terrain vehicle commonly adopt a separated structure and include two parts: a seat cushion and a backrest. The seat cushion is directly fixed on the seat mounting frame of the frame; the backrest is fixed on the cab frame. For the seat cushion and backrest with separated structure, it is necessary to ensure the stability of the connection structure of the seat cushion, the backrest and the frame to avoid relative vibration between the seat cushion and the backrest which affects driving comfort during vehicle travel. However, existing backrest assembly technology leaves a large interstice between the backrest and the frame, resulting in instability of the backrest assembly structure and noise produced during vehicle travel, so driving comfort is affected.

Therefore, how to improve the stability of a seat installation structure of an all-terrain vehicle is a technical defect which urgently needs to be solved for those skilled in the art.

BRIEF SUMMARY OF THE INVENTION

In view of this, the invention provides a type of seat installation structure of an all-terrain vehicle to improve the stability of seat installation structure. The invention also provides an all-terrain vehicle using such a seat installation structure.

In order to achieve the above objects, the invention provides the following technical schemes:

A type of seat installation structure of an all-terrain vehicle includes a cab frame and a seat backrest arranged on the frame. The back mounting side of the seat backrest includes a first mounting part and a second mounting part arranged up and down respectively.

The first mounting part includes an upper support frame located at the upper end of the frame. An installation hole is arranged on the upper support frame. An installation pin extends out of the seat backrest and is inserted into the installation hole.

The second mounting part includes a lower support frame located at the lower end of the frame. The lower end of the seat backrest is provided with an installation buckle mounted on the lower support frame.

Preferably, in the above seat installation structure of an all-terrain vehicle, the bottom end of the lower support frame is provided with a support bar that provides radial support for the installation buckle. A clamping opening of the installation buckle is attached around the support bar.

Preferably, in the above seat installation structure of an all-terrain vehicle, the installation buckle includes first and second installation buckles arranged on both sides of the seat backrest width direction respectively. The clamping openings of the installation buckles are both arranged downwards.

Preferably, in the above seat installation structure of an all-terrain vehicle, the lower support frame includes a first mounting column and a second mounting column arranged at both ends of the support bar. Ends of the first mounting column and the second mounting column are fixed to the frame.

Preferably, in the above seat installation structure of an all-terrain vehicle, a support base extends out of the upper end of the seat backrest and makes contact with the upper support frame. The installation pin is located where the support base contacts the upper support frame.

Preferably, in the above seat installation structure of an all-terrain vehicle, the installation pin includes an installation pin body fixed in the support base, with a limit head located at the end of the installation pin body. The limit head has a conical shape. A root part of the limit head is fixed to the end part of the installation pin body. The maximum outer diameter of the limit head is not less than the inner diameter of the installation hole.

An arc transition is arranged between the root part of the limit head and the installation pin body.

Preferably, in the above seat installation structure of an all-terrain vehicle, a cushioning pad for the installation pin is arranged inside the installation hole of the upper support frame. The cushioning pad includes a cushioning part, with a first annular ear arranged at one end of the cushioning part and a second annular ear arranged at the other end of the cushioning part. When assembled into the installation hole, the cushioning part is located in the inner ring of the installation hole. The first annular ear makes contact with the inner wall of the upper support frame around the installation hole and the second annular ear makes contact with the outer wall of the upper support frame around the installation hole.

Preferably, in the above seat installation structure of an all-terrain vehicle, the outer diameter of the first annular ear is smaller than that of the second annular ear.

Preferably, in the above seat installation structure of an all-terrain vehicle, the upper support frame is provided as a horizontally extending support tube supporting the seat backrest. The installation hole is on the tube wall of the support tube. The tops of the first and second mounting columns of the lower support frame are fixed to the support tube.

The present invention is also an all-terrain vehicle which includes a body, with a cab arranged on the body and the seat arranged inside the cab. The seat is provided with the seat installation structure of the all-terrain vehicle as described in any of the above.

The seat installation structure of an all-terrain vehicle provided by this invention includes the cab frame and the seat backrest arranged on the frame. The back mounting side of the seat backrest includes the first mounting part and the second mounting part arranged up and down respectively. The first mounting part includes the upper support frame located at the upper end of the frame. The installation hole is on the upper support frame, and the installation pin extends out of the seat backrest to be inserted into the installation hole. The second mounting part includes the lower support frame located at the lower end of the frame. The lower end of the seat backrest includes the installation buckle to be mounted on the lower support frame. The seat backrest is fixed inside the cab by mounting the first mounting part and second mounting part of the upper part and lower part of the seat backrest onto the frame. The seat backrest is supported by the upper support frame of the first mounting part. The installation pin extends out of the seat backrest and is inserted into the installation hole to limit the top of the seat backrest. The lower end of the seat backrest is supported by the second installation part. The second installation part includes the lower support frame at the lower end of the frame. The lower end of the seat backrest is provided with the installation buckle. The installation buckle is mounted on the lower support frame such that the lower end of the seat backrest is supported by the lower support frame. The installation structure of the seat backrest is supported by the bottom installation buckle. The top of the seat backrest is limited by the inserting of the installation pin into the installation hole to prevent the seat backrest from moving up and down on the frame and vibrating during vehicle travel, so the stability of the seat installation structure of the all-terrain vehicle is improved.

BRIEF DESCRIPTION OF THE DRAWINGS

In order to describe the present invention more clearly, drawings showing a preferred embodiment are as follows. Ordinary technical personnel in the art can design other embodiments using the premise of the present invention without requiring creative labor.

DETAILED DESCRIPTION OF THE PREFERRED EMBODIMENTS

The invention is a type of seat installation structure of an all-terrain vehicle which improves the stability of the seat. The invention is also a type of all-terrain vehicle using the inventive seat installation structure.

Figure 1:
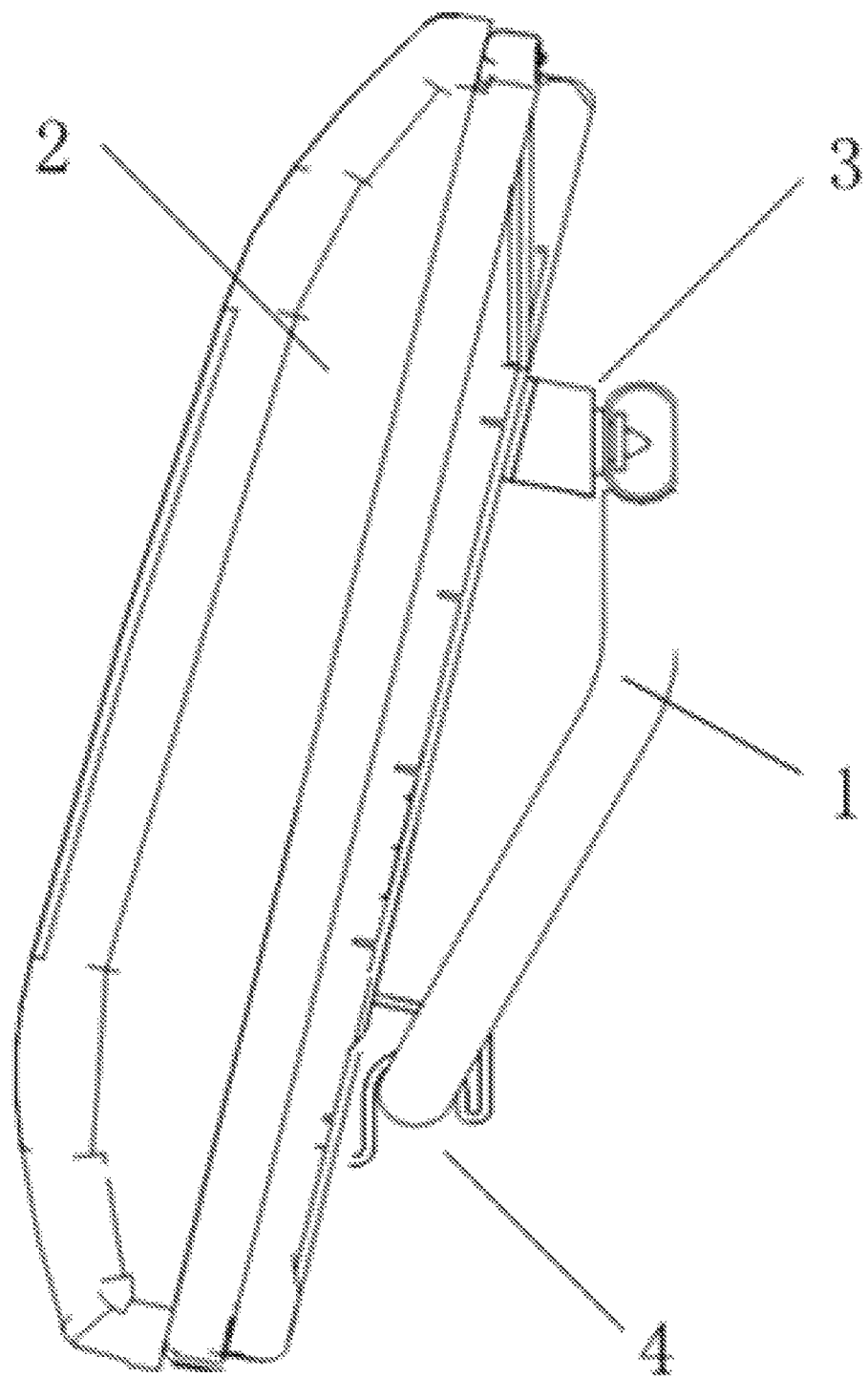
FIG. 1 is a side view showing the seat installation structure of the all-terrain vehicle provided by the invention.

As shown in FIG. 1, a seat backrest 2 is arranged on a frame 1 which is part of the frame of an all-terrain vehicle. The back mounting side of the seat backrest 2 includes a first mounting part 3 and a second mounting part 4 arranged up and down respectively. The first mounting part 3 includes an upper support frame 31 (identified in FIG. 3) located at the upper end of the frame. An installation hole 32 is formed in the upper support frame 31. An installation pin 33 extends out of the seat backrest 2. As part of securing the seat backrest 2 to the frame 1, the installation pin 33 is inserted into the installation hole 32. The second mounting part 4 includes a lower support frame 41 (identified in FIG. 2) located at the lower end of the frame 1. An installation buckle 42 is provided on the lower end of the seat backrest 2. As part of securing the seat backrest 2 to the frame 1, the installation buckle 42 is mounted on the lower support frame 41. The seat backrest 2 is thus fixed inside the cab through the frame 1, with the seat backrest 2 and the frame 1 connected together by the first mounting part 3 and second mounting part 4. The interaction between the installation pin 33 and the installation hole 32 limits upward and/or downward movement of the top of the seat backrest 2. The connection between the installation buckle 42 and the lower support frame 41 supports the seat backrest 2 and limits forward and/or rearward movement of the bottom of the seat backrest 2. The first mounting part 3 and the second mounting part 4 thus collectively prevent vibrating of the seat backrest 2 relative to the frame 1 during the vehicle travel so the stability of the seat installation structure of the all-terrain vehicle is improved.

In the preferred embodiment of the present invention, the bottom end of the lower support frame 41 has a horizontally extending support bar 411 which provides radial support for the installation buckle 42. The clamping opening for the installation buckle 42 is attached over the support bar 411. The supporting of the weight of the back 2 by the second mounting part 4 reduces or eliminates the vertical load on the installation pin 33. The axial direction of the support column 411 is in the width direction of the seat backrest 2, and the open side of the clamping opening of the installation buckle 42 is arranged downward.

Figure 2:
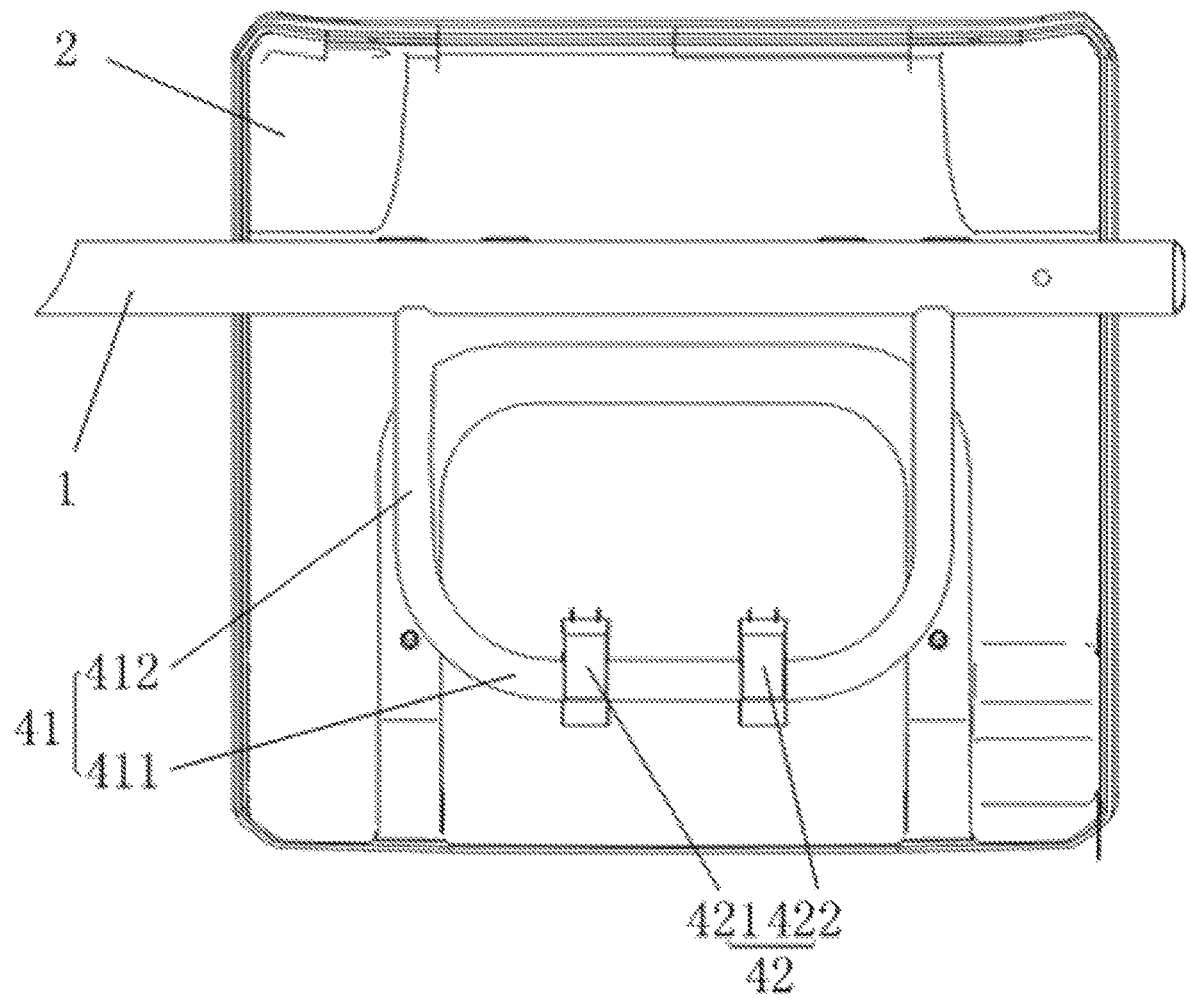
FIG. 2 is a front view showing the seat installation structure of the all-terrain vehicle provided by the invention.
Figure 3:
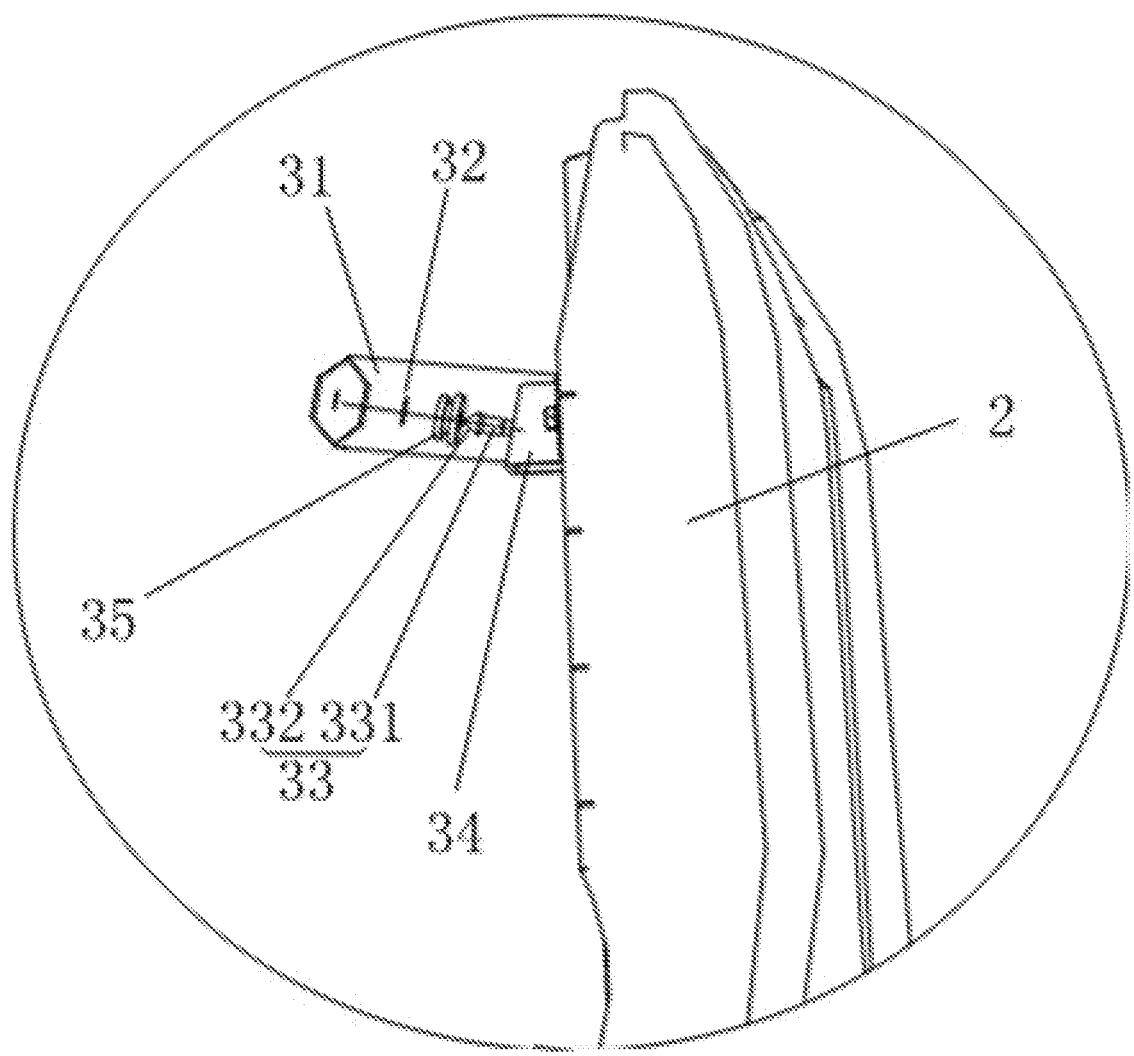
FIG. 3 is an exploded view, at a slight perspective angle, showing the installation structure of the upper support frame of FIG. 1.
Figure 4:
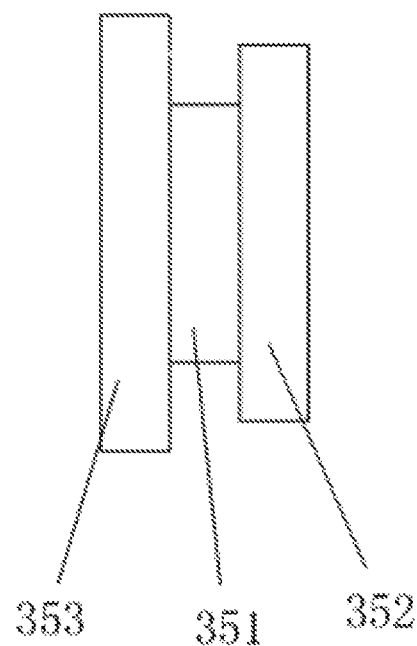
FIG. 4 is an enlarged side view showing the structure of the cushioning pad of FIG. 3.

In the preferred embodiment of the present invention as shown in FIG. 2, two installation buckles 421, 422 are arranged on both sides of the width direction of the seat backrest 2 respectively, so the bottom of the seat backrest 2 is supported by two points to further ensure the support stability of the seat backrest 2.

In the preferred embodiment of the present invention, the lower support frame 41 includes first and second mounting columns extending upwardly from both ends of the support bar 411. The top ends of both the first mounting column 412 and the second mounting column 412 are fixed to the frame 1.

In the preferred embodiment of the present invention, a support base 34 (identified in FIG. 3) extends out of the upper end of the seat backrest 2 and makes contact with the upper support frame 31 after the installation pin 33 is inserted into the installation hole 32. The installation pin 33 is located where the support base 34 and the upper support frame 31 make contact.

In the preferred embodiment of this invention, the installation pin 33 includes an installation pin body 331 fixed in the support base 34 and a limit head 332 arranged at the free end of the installation pin body 331. The limit head 332 has a conical shape. The maximum outer diameter of the limit head 332 is not less than the inner diameter of the installation hole 32 (by itself or with the cushioning pad 35 described below), such that pushing the limit head 332 through the installation hole 32 will require some elastic deflection of the installation hole 32 which springs back to hold the installation pin 33 in the installation hole 32. However, the fit between the installation pin 33 and the installation hole 32 is such that, when the seat backrest 2 needs to be removed, it can be pulled to detach the installation pin 33 from the installation hole 32 to realize disassembling of the seat backrest 2 from the frame 1.

In the preferred embodiment of the present invention, a cushioning pad 35 for the said installation pin is positioned inside the installation hole 32. The cushioning pad 35 includes a cushioning part 351 between a first annular ear 352 and a second annular ear 353. When assembled into the installation hole 32, cushioning part 351 is located in the inner ring of the installation hole 32. The first annular ear 352 makes contact with the inner wall of the upper support frame 31 around the installation hole 32 and the second annular ear 353 makes contact with the outer wall of the upper support frame 31 around the installation hole 32. The installation pin 33 is preferably formed of metal material, but vibration between the installation pin 33 and the installation hole 32 is cushioned by the cushioning pad 35, so the connection stability between the two of them is improved and vibration noise is reduced.

In the preferred embodiment of the present invention, the outer diameter of the first annular ear 352 is smaller than that of the second annular ear 353. The seat backrest 3 is installed on the upper support frame 31 by pressing the installation pin 33 into the cushioning pad 35 with the limit head 332 extending through the installation hole 32. The cushioning pad 35 is preinstalled on the upper support frame 31. The outer diameter of the first annular ear 352 is smaller than that of the second annular ear 353 in order to reduce the installation difficulty of cushioning pad 35 so the cushioning pad 35 can be easily inserted into the installation hole 32. At the same time, the second annular ear 353 has a larger outer diameter to reduce vibration between the support base 34 and the upper support frame 31 so the stability of the seat backrest is further improved.

In the preferred embodiment of the present invention, the upper support frame 31 is provided as a horizontally extending support tube supporting the seat backrest 2. The installation hole 32 is on the tube wall of the support tube. The tops of the first and second mounting columns 412 of the lower support frame 41 are fixed to the support tube. The frame 1 of the cab of the all-terrain vehicle is thus provided mostly as a tubular support structure. The tube of the upper support frame 31 can have at least one flat side to conveniently mate with the support base 34, so the stability of the support is improved.

Based on the seat installation structure of the all-terrain vehicle provided in the above embodiment, the invention is also a type of all-terrain vehicle which includes the seat installation structure.

The above descriptions of the disclosed embodiment will enable professional and technical personnel in the art to achieve or use the present invention. The general principles defined herein may be achieved in other embodiments without departing from the spirit or essential attributes of the present invention. Therefore; this invention will not be limited to the embodiment shown in the drawings, but to conform to the maximum extent of principles and new features that are disclosed herein.

The invention claimed is:

1. A seat installation structure for an all-terrain vehicle comprising:
   a cab frame having an upper support frame and a lower support frame, with an installation hole in the upper support frame;
   a seat backrest arranged on the cab frame;
   an installation pin extending out of a back mounting side of the seat backrest, the installation pin being inserted into the installation hole; and
   an installation buckle on the back mounting side of the seat backrest, the installation buckle supporting the weight of the seat backrest from the lower support frame by wrapping at least partially around an upper side of the lower support frame, such that the installation pin and the installation buckle jointly secure the seat backrest to the cab frame.

2. The seat installation structure according to claim 1, wherein a bottom end of the lower support frame comprises a support bar that provides radial support for the installation buckle, the installation buckle having a clamping opening for placement onto the support bar when the seat back is installed onto the cab frame.

3. The seat installation structure according to claim 2, comprising at least two installation buckles arranged side to side in the said seat backrest width direction, wherein clamping openings of the installation buckles both open downwards.

4. The seat installation structure according to claim 2, wherein the lower support frame includes a first mounting column and a second mounting column arranged at ends of the support bar, wherein upper ends of the first mounting column and the second mounting column are fixed to a horizontally extending part of the upper support frame.

5. The seat installation structure according to claim 1, wherein the installation pin extends out of a support base projecting out of an upper end of the seat backrest, the support base making contact with the said upper support frame, with the installation pin being located where the support base contacts the upper support frame.

6. The seat installation structure according to claim 5, wherein the installation pin comprises an installation pin body fixed in the support base and a limit head at an end of the installation pin body, the limit head having a conical shape, the maximum outer diameter of the limit head being not less than the inner diameter of the installation hole.

7. The seat installation structure according to claim 5, further comprising a cushioning pad extending through the installation hole with the installation pin, the cushioning pad comprising a cushioning part between a first annular ear and a second annular ear, wherein the first annular ear makes contact with an inner wall surface of the upper support frame around the installation hole, and wherein the second annular ear makes contact with an outer wall surface of the upper support frame around the installation hole.

8. The seat installation structure according to claim 7, wherein the outer diameter of the first annular ear is smaller than the outer diameter of the second annular ear.

9. The seat installation structure according to claim 1, wherein the upper support frame is formed from a tube, with the installation hole being through a wall of the tube.

10. A seat installation structure for an all-terrain vehicle comprising:
    a cab frame having a horizontally extending upper support frame with an installation hole therein and a lower support frame hanging from the upper support frame, the lower support frame having a first mounting column and a second mounting column fixed at their upper ends to the upper support frame with a horizontally extending support bar running between the first and second mounting columns;
    a seat backrest arranged on the cab frame;
    an installation pin extending out of a back mounting side of the seat backrest, the installation pin being inserted into the installation hole; and an installation buckle on the back mounting side of the seat backrest, the installation buckle supporting the weight of the seat backrest from the horizontally extending support bar of the lower support frame, such that the installation pin and the installation buckle jointly secure the seat backrest to the cab frame.

\* \* \* \* \*